US012641007B2

(12) United States Patent
     Druta

(10) Patent No.: US 12,641,007 B2
(45) Date of Patent: May 26, 2026

(54) OUT-OF-BAND SIGNALING AND ENERGY CONSUMPTION BASED ROUTING

(71) Applicant: AT&T Intellectual Property I, L.P., Atlanta, GA (US)

(72) Inventor: Dan Druta, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 304 days.

(21) Appl. No.: 18/088,511

(22) Filed: Dec. 23, 2022

(65) Prior Publication Data

US 2024/0214300 A1     Jun. 27, 2024

(51) Int. Cl.
    *H04L 45/12* (2022.01)
    *H04L 45/74* (2022.01)

(52) U.S. Cl.
    CPC ............ *H04L 45/124* (2013.01); *H04L 45/74* (2013.01)

(58) Field of Classification Search
    CPC .............................. H04L 45/124; H04L 45/74
    USPC ......................................................... 370/392
    See application file for complete search history.

(56) References Cited

U.S. PATENT DOCUMENTS

| | | | | |
|---|---|---|---|---|
| 2015/0098338 A1* | 4/2015 | Bhattacharya | .......... | H04L 45/22 |
| | | | | 370/241.1 |
| 2017/0005909 A1* | 1/2017 | Hunt | ........................ | H04L 45/06 |
| 2017/0331577 A1* | 11/2017 | Parkvall | .................. | H04W 8/18 |
| 2019/0070912 A1* | 3/2019 | Lin | ........................ | B60C 23/123 |

FOREIGN PATENT DOCUMENTS

| | | | | |
|---|---|---|---|---|
| WO | WO2019070912 | * | 4/2019 | ............. H04L 45/22 |
| WO | WO-2019070912 A1 | * | 4/2019 | ............. H04L 45/22 |

OTHER PUBLICATIONS

Contreras, L., et al., "A Network Service Provider Perspective on Network Slicing", IEEE Software Defined Networks, IEEE Softwarization, Jan. 2018, 6 pages.
Pearson, "Anatomy-of-an-IPv4-Packet-Anatomy-of-an-IPv4", Feb. 29, 2012, Pearson IT Certification, 4 pages.
Cisco, "Policy-Base Routing", Cisco Catalyst 3950 Series Switches, Aug. 6, 2019, 3 pages.
Cisco, "How to configure-OSPF cost", Cisco-Community, Mar. 1, 2019, 8 pages.
Junos, "Routing Policy vs Policy Based Routing on Junos", Article ID KB10876, Aug. 20, 2020, 3 pages.
IBM, "TCP header field definitions", IBM Documentation, Nov. 15, 2022, 3 pages.
Juniper Networks, "Example Configuring Flter-Based Forwarding to a Specific Outgoing Interface or Destination IP Address". Mar. 16, 2023, accessed from https://www.juniper.net/documentation/us/en/software/junos/routing-policy/topics/topic-map/filter-based-forwarding-policy-based-routing.html, 17 pages.

(Continued)

*Primary Examiner* — Hermon Asres

(57) ABSTRACT

A processing system including at least one processor deployed in a communication network may obtain at least a first energy usage indicator of at least a first network element of the communication network, obtain a selection of an energy factor-based routing for at least one packet, and route the at least one packet in response to the selection of the energy factor-based routing, where the energy factor-based routing is based upon the at least the first energy usage indicator of the at least the first network element.

20 Claims, 3 Drawing Sheets

(56)  References Cited

OTHER PUBLICATIONS

Stevens, W. Richard et al., 2 pages. , "TCP UDP Pocket Guide", TCP/IP Illustrated, vol. 1: The Protocols, vol. 2: The Implementation, accessed Dec. 17, 2022, 2 pages.

Cloudfare, "What is routing-IP-routing" downloaded from https://www.cloudflare.com/learning/network-layer/what-is-routing/ on Dec. 17, 2022, 5 pages.

Cisco, "Understand Open Shortest Path First-(OSPF)", Design-Guide, downloaded from https://www.cisco.com/c/en/us/support/docs/ip/open-shortest-path-first-ospf/7039-1.html on Dec. 17, 2022, 67 pages.

Cisco, "What Is Routing" downloaded from https://www.cisco.com/c/en/us/products/routers/what-is-routing.html on Dec. 17, 2022, 4 pages.

* cited by examiner

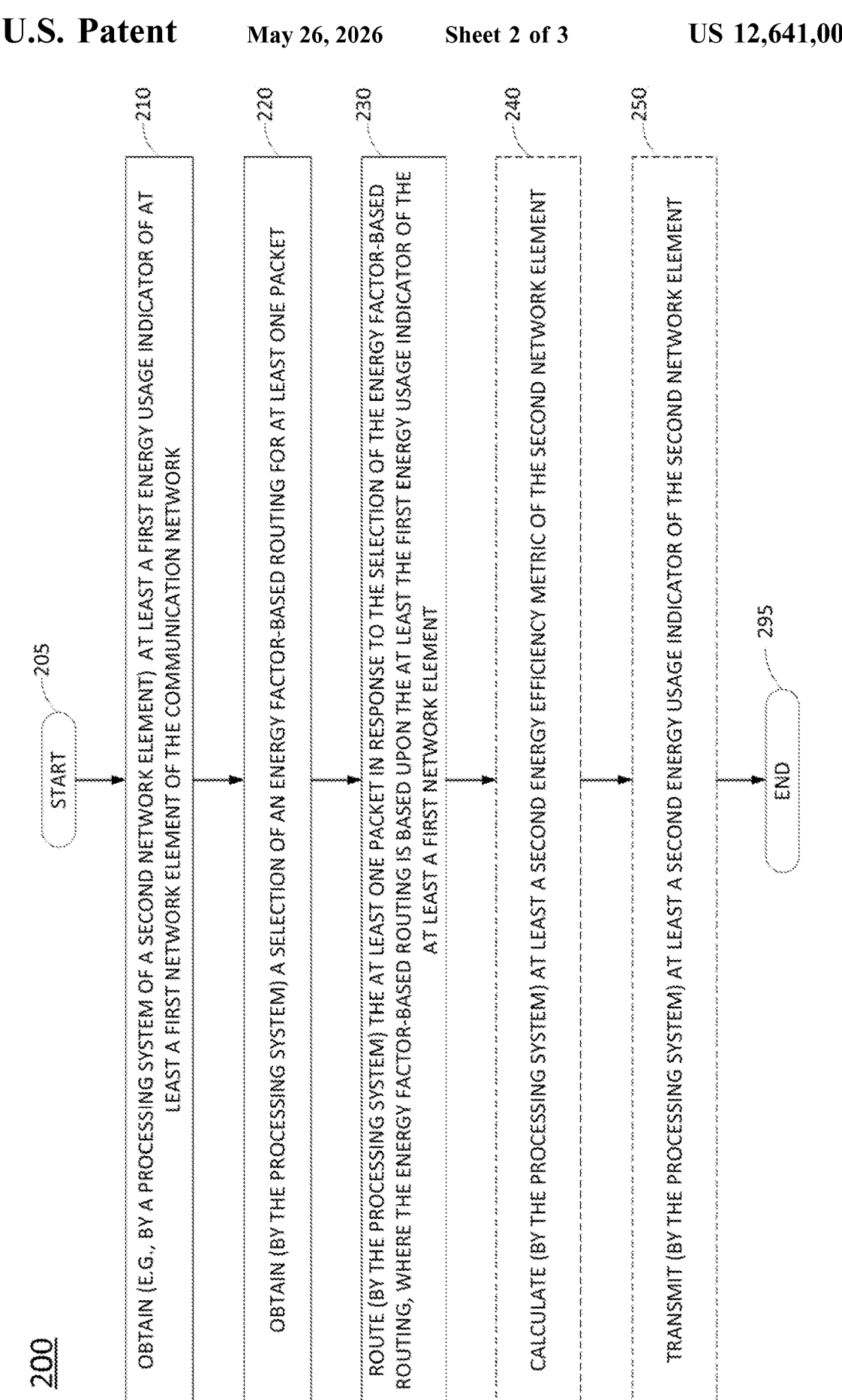

200

START 205

OBTAIN (E.G., BY A PROCESSING SYSTEM OF A SECOND NETWORK ELEMENT) AT LEAST A FIRST ENERGY USAGE INDICATOR OF AT LEAST A FIRST NETWORK ELEMENT OF THE COMMUNICATION NETWORK 210

OBTAIN (BY THE PROCESSING SYSTEM) A SELECTION OF AN ENERGY FACTOR-BASED ROUTING FOR AT LEAST ONE PACKET 220

ROUTE (BY THE PROCESSING SYSTEM) THE AT LEAST ONE PACKET IN RESPONSE TO THE SELECTION OF THE ENERGY FACTOR-BASED ROUTING, WHERE THE ENERGY FACTOR-BASED ROUTING IS BASED UPON THE AT LEAST THE FIRST ENERGY USAGE INDICATOR OF THE AT LEAST A FIRST NETWORK ELEMENT 230

CALCULATE (BY THE PROCESSING SYSTEM) AT LEAST A SECOND ENERGY EFFICIENCY METRIC OF THE SECOND NETWORK ELEMENT 240

TRANSMIT (BY THE PROCESSING SYSTEM) AT LEAST A SECOND ENERGY USAGE INDICATOR OF THE SECOND NETWORK ELEMENT 250

END 295

OUT-OF-BAND SIGNALING AND ENERGY CONSUMPTION BASED ROUTING

The present disclosure relates generally to communication network operations, and more particularly to methods, computer-readable media, and apparatuses for routing at least one packet in response to a selection of an energy factor-based routing.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for routing at least one packet in response to a selection of an energy factor-based routing.

To facilitate understanding, identical reference numerals have been used, where possible, to designate identical elements that are common to the figures.

DETAILED DESCRIPTION

Figure 1:
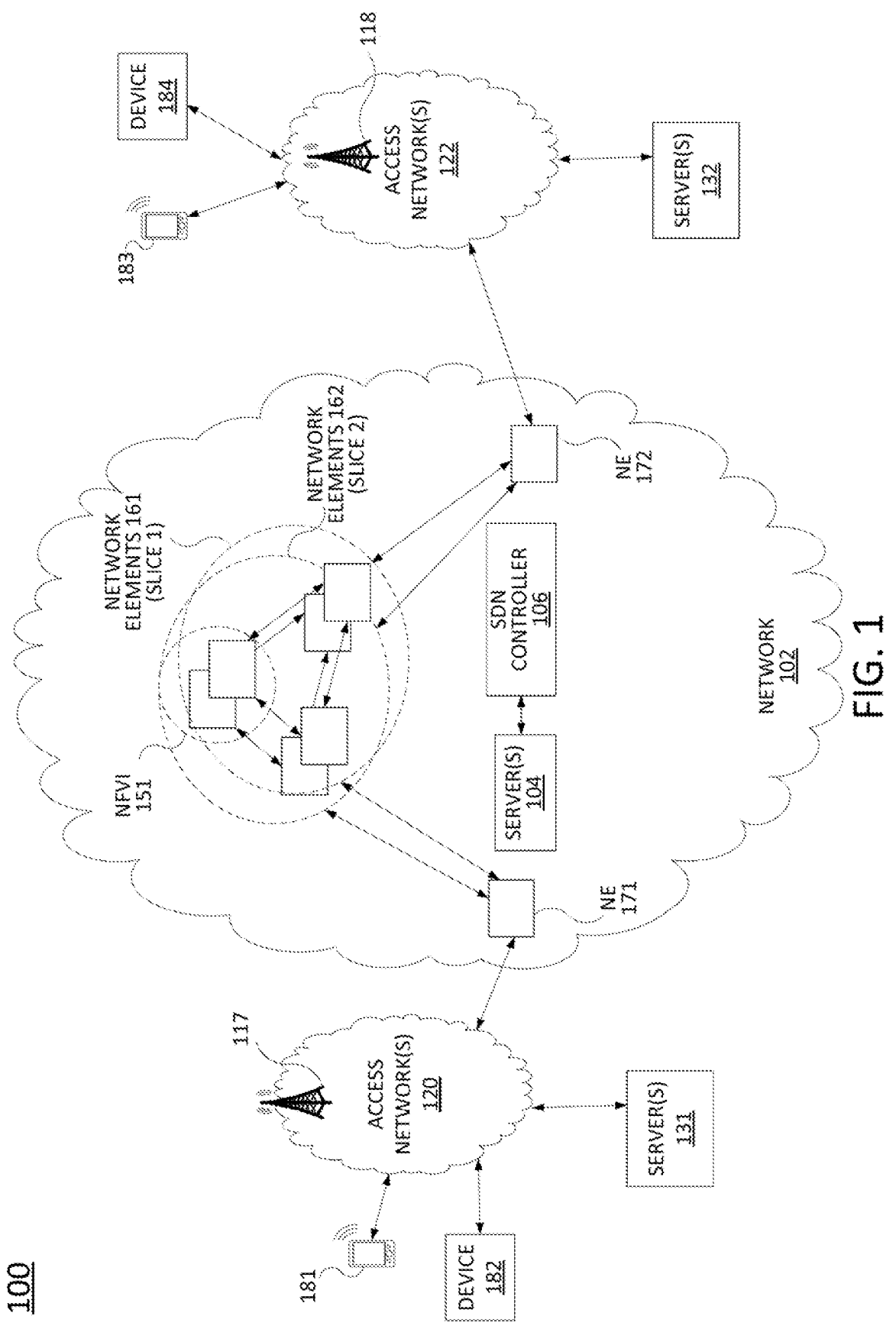
FIG. 1 illustrates an example network related to the present disclosure.

Examples of the present disclosure describe methods, computer-readable media, and apparatuses for routing at least one packet in response to a selection of an energy factor-based routing. For instance, in one example, a processing system including at least one processor deployed in a communication network may obtain at least a first energy usage indicator of at least a first network element of the communication network, obtain a selection of an energy factor-based routing for at least one packet, and route the at least one packet in response to the selection of the energy factor-based routing, where the energy factor-based routing is based upon the at least the first energy usage indicator of the at least the first network element.

To illustrate, the Internet has accelerated the use of mobile networks and facilitated the digital transformation for many fields. While data networks have evolved and capacity has generally increased, many aspects have remained relatively unchanged over the course of years. Examples of the present disclosure associate non-Internet Protocol (IP) information, e.g., metadata, with traffic flows to be analyzed, aggregated, and processed in real-time or on demand. In particular, in one example, such metadata may comprise energy utilization information in accordance with the present disclosure, which may be used to calculate network utilization energy consumption for an entity, to request energy utilization-aware routing, and so forth. In one example, the present disclosure may include a secure control channel that is established and enabled in parallel to a user plane data network (e.g., an "out-of-band" control channel) for passing metadata (e.g., energy utilization data, and other data) between network nodes. In one example, the control channel may use a publish/subscribe model, a broadcasting model, or the like.

Examples of the present disclosure provide a secure, open, and flexible mechanism for applications and network infrastructure to establish an event-driven fabric or control channel where network node related metadata or other parameters can be shared. In addition, such an application level control channel may be extended to additional uses, including automatic multi-factor authentication where tokens can be sent using the secure, trusted network. In addition, the exposure of network node parameters via a secure control channel of the present disclosure may further eliminate the need for application programming interface (API) gateways or the like.

In one example, the present disclosure may implement a control channel via network slicing or other isolation techniques. For instance, the control channel may comprise a low-bandwidth, latency-sensitive virtual network that may enable authorized participants (e.g., network nodes) to join. In one example, participants may subscribe to specific messaging channels of interest, such as energy metadata or authentication tokens. To illustrate, participants in a control channel virtual network may be on-boarded using public key infrastructure (PKI). In addition, based on flexible access control mechanism(s), participants may subscribe to authorized sub-channels, effectively creating a secure, open control channel via a trusted, flexible virtual network for metadata exchange/distribution.

It is again noted that examples of the present disclosure enable the exchange of non-network traffic-related metadata that may augment the ability to perform packet/flow handling decisions (e.g., routing) in addition to supporting the calculation of complex performance indicators, such as network-based energy utilization per flow, per application, or the like, energy efficiency per node, quantities and/or percentages of energy utilization per energy source and/or per type of energy source (e.g., natural gas, coal, nuclear, wind, solar, geothermal, hydroelectric, etc.), and so forth. Built at scale, this control channel virtual network may also increase security for web-based applications, may be used to perform transactions on distributed ledger networks, may facilitate exchange of client-server multi-factor authentication messaging, and other network-based services that may benefit from a dedicated, secure, and semi-private virtual network. These and other aspects of the present disclosure are discussed in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network, and one or more access networks 120 and 122, and the Internet (not shown). In one example, network 102 may combine core network components of a cellular network with components of a triple play service network; where triple-play services include telephone services, Internet services and video services (e.g., television services) to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a video broadcast network, e.g., a traditional cable provider network or an Internet Protocol Television (0) network, as well as an Internet Service Provider (ISP) network. In one example network 102 may include multiple "network slices," e.g., slices 1 and 2 comprising network elements 161 and 162, respectively. Slices 1-2 may include hardware components, which may comprise physical network elements, or virtual network elements on shared hardware (e.g., virtual network elements, or network functions), and capacity allocations (e.g., bandwidth on a link, etc.). It should be noted that a "slice" may be further characterized by service level and security targets, e.g., minimum throughput, uptime, priority, etc. In one example, network 102 may include one or more servers 104, a software defined network (SDN) controller 106, and network elements (NEs) 171 and 172, as discussed in further detail below. In one example, network 102 may also include a plurality of video servers (e.g., a broadcast server, a cable head-end), a plurality of content servers, an advertising server, and so forth. For ease of illustration, various additional elements of network 102 are omitted from FIG. 1.

In one example, the access networks 120 and 122 may comprise fiber optic access networks (e.g., fiber to the curb (FTTC) and/or fiber to the premises (FTTP) access networks), Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, 3rd party networks, and the like. For example, the operator of network 102 may provide data services, voice/telephony services, cable television services, an IPTV service, a streaming service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a communication network service provider. The network 102 and the access networks 120 and 122 may be operated by different service providers, the same service provider or a combination thereof, or may be operated by entities having core businesses that are not related to communication services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 may include at least wireless access point 117 (e.g., a cellular base station). Similarly, access network(s) 122 may include at least wireless access point 118 (e.g., a cellular base station).

In one example, the access network(s) 120 may be in communication with various devices, local networks, and/or computing systems/processing systems. For instance, access network(s) 120 may be in communication with devices 181 and 182, and server(s) 131. Similarly, the access network(s) 122 may be in communication with devices 183 and 184, and server(s) 132. Devices 181-184 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of devices 181-184 may represent one or more user/subscriber devices (e.g., user equipment (UE)/user endpoint devices). In one example, any one or more of devices 181-184 may be equipped with wired and/or wireless networking/communication capability. In this regard, any one or more of devices 181-184 may include transceivers for wireless communications, e.g., for Institute for Electrical and Electronics Engineers (IEEE) 802.11 based communications (e.g., "Wi-Fi"), IEEE 802.15 based communications (e.g., "Bluetooth", "ZigBee", etc.), cellular communication (e.g., 3G, 4G/LTE, 5G, etc.), and so forth. In addition, server(s) 131 and 132 may represent one or more computing devices/processing systems comprising web servers, content servers and/content distribution network (CDN) nodes, database servers, and so forth.

In accordance with the present disclosure, server(s) 104 may comprise a computing system or server, or one or more computing systems or servers, such as computing system 300 depicted in FIG. 3, and may individually or collectively be configured to perform operations or functions for routing at least one packet in response to a selection of an energy factor-based routing (such as illustrated and described in connection with the example method 200 of FIG. 2). Similarly, SDN controller 106 may comprise one or more computing systems or servers, such as computing system 300 depicted in FIG. 3, and may individually or collectively be configured to perform operations or functions in connection with various examples of the present disclosure.

It should also be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the network 102 may comprise network function virtualization infrastructure (NFVI), e.g., servers in a data center or data centers that are available as host devices to host virtual machines (VMs) and/or containers comprising virtual network functions (VNFs). In other words, at least a portion of the network 102 may incorporate software-defined network (SDN) components. In this regard, NFVI 151 is labeled in FIG. 1, and may comprise a node that host network elements (e.g., virtual network functions) from both slice 1 and slice 2 (e.g., at least one of network elements 161 and at least one of network elements 162). It should be understood that various others of network elements 161 and network elements 162 may be hosted on other NFVI of network 102. It should also be noted that in accordance with the present disclosure, the term "virtual network function" (or "VNF"), may refer to both virtual machine (VM)-based VNFs, e.g., VNFs deployed as VMs, and containerized or container-based (VNFs), e.g., VNFs deployed as containers, such as within a Kubernetes infrastructure, or the like, also referred to as "cloud-native network functions" (CNFs). To further illustrate, in one example, network elements 161-162 may comprise NFVI, e.g., in accordance with an SDN architecture of network 102, which may be configured to perform the functions of routers, switches, and other devices. For instance, network elements 161-162 may represent virtual provider edge (VPE) routers, virtual mobility management entities (vMMEs), virtual serving gateways (vSGWs), virtual packet data network gateways (vPDNGWs or VPGWs), or other virtual network functions (VNFs). It should be noted that in other, further, and different examples, network elements 161-162 may alternately or additionally comprise physical devices (e.g., dedicated devices) that may include routers, switches, firewalls, gateways, and so forth.

Similarly, in one example, network elements 171 and 172 may comprise gateways, routers, switches, serving gateways (SGWs), mobility management entity (MMEs), packet data network gateways (PGWs or PDNGWs), network slice selection functions (NSSFs), or the like. In one example, network elements 171 and 172 may comprise provider edge (PE) routers interfacing with access network(s) 120 and 122, e.g., for non-cellular network-based communications. In one example, network elements 171 and 172 may also comprise VNFs hosted by and operating on additional NFVI. However, in another example, either or both of network elements 171 and 172 may comprise dedicated devices or components. In one example, network elements 161, 162, 171, and/or 172 may be controlled and managed by the SDN controller 106. For instance, in one example, SDN controller 106 is responsible for such functions as provisioning and releasing instantiations of VNFs to perform the functions of routers, switches, and other devices, initializing routing tables and other operating parameters for the VNFs, and so forth. In one example, SDN controller 106 may maintain communications with VNFs and/or host devices/NFVI via a number of control links which may comprise secure tunnels for signaling communications over an underling IP infrastructure of network 102. In other words, the control links may comprise virtual links multiplexed with transmission traffic and other data traversing network 105 and carried over a shared set of physical links. In accordance with the present disclosure, each of network elements 161, 162, 171, and/or 172 and/or NFVI 151 may comprise a computing system or server, or one or more computing systems or servers, such as computing system 300 depicted in FIG. 3, and may individually or collectively be configured to perform operations or functions for routing at least one packet in response to a selection of an energy factor-based routing (such as illustrated and described in connection with the example method 200 of FIG. 2).

In an illustrative example, network 102 may provide for energy utilization-aware routing of packets/flows (e.g., an energy factor-based routing). For instance, as noted above, network elements 161, 162, 171, and/or 172 may comprise routers, switches, gateways, or the like. In one example, these routing elements may be configured with routing tables and/or policies for making routing decisions for packets/flows. In one example, server(s) 104 and/or SDN controller 106 may be tasked with generating and providing initial link state databases, routing tables, or the like to network elements 161, 162, 171, and/or 172. In one example, server(s) 104 and/or SDN controller 106 may be tasked with generating and providing routing policies to network elements 161, 162, 171, and/or 172. For instance, in one example, the present disclosure may provide for a choice between [renewable energy-based routing, no preference], [energy-efficient routing, no preference], or the like. In one example, the present disclosure may provide a choice between several available tiers or categories of energy factor-based routing, such as [energy efficient, balanced, or performance]. Accordingly, server(s) 104 and/or SDN controller 106 may provision network elements 161, 162, 171, and/or 172 with corresponding policies, or rules, to effect these different preferences. In one example, network elements 161, 162, 171, and/or 172 may perform packet/flow routing in accordance with one or more routing protocols using a link state database, routing table or the like, e.g., unless superseded by one or more policies related to energy utilization-aware/energy factor-based routing (or other policy). For instance, in one example, network elements 161, 162, 171, and/or 172 may route packets/flows by default in accordance with Interior Gateway Protocol (IGP), Routing Information Protocol (RIP), Open Shortest Path First (OSPF), exterior routing protocols (e.g., Exterior Gateway Protocol (EGP), Border Gateway Protocol (BGP), etc.), or the like.

In order to provide for energy utilization-aware routing, in one example, network elements 161, 162, 171, and/or 172 may exchange energy utilization information with each other. In other words, participating network elements within a routing domain, or in multiple domains that participate in energy utilization-aware routing, may track their own energy utilizations, and may report such information to peers. For instance, each participating network element may report one or more of: a source of energy powering the network element (e.g., natural gas, coal, nuclear, wind, solar, geothermal, hydroelectric, etc.), a data utilization per unit time and/or per data volume processed via the network element, and so forth. In one example, energy utilization information may be exchanged via an "out-of-band" control channel virtual network. For instance, a second communication mode may be used to exchange energy utilization information that is different from a first communication mode that may be used to convey user/data traffic.

In one example, the second communication mode may comprise routing protocol messages, e.g., in accordance with a routing protocol as described above, or the like. For instance, in addition to advertising routes, reachability, neighborhood topology, link costs, etc. via link state advertisements (LSAs), other link state packets, or the like, the present disclosure may extend such routing protocol messages to include energy utilization information. In another example, the second communication mode may be a different logical network from one that is used for user/data traffic. For instance, slice 1 may be used for user/data traffic, while slice 2 may comprise an overlay network/control channel virtual network for exchanging energy utilization information (and in one example, additional control information). In other words, network elements 161 and 162 may have a one-to-one correspondence on respective shared NFVI elements/nodes. For instance, NFVI 151 may host one of the network elements 161 for routing user/data traffic within slice 1, and may also host a corresponding one of the network elements 162 to participate in an energy utilization information exchange network within slice 2. In such an example, the energy utilization information may pertain to the one of the network elements 161 and/or the host NFVI 151 as a whole. Alternatively, or in addition, the second communication mode may comprise a virtual local area network (VLAN) that may be similarly established for exchanging energy utilization information.

In one example, energy utilization information may be received at a given network element in a message that includes one or more aspects of energy utilization information for one or more other network elements. For instance, the aspects of energy utilization information may include a source of energy for a node/network element, an energy efficiency metric, e.g., an energy utilization per unit time (e.g., per minute, per hour, etc.) and/or per data volume (e.g., per packet, per MB, etc.), and so forth. In one example, the second communication mode may be used to obtain additional routing information, such as link cost, reachability, etc. For instance, slice 2 may be used to exchange routing protocol messages relating to routing that will occur in slice 1. In one example, a recipient network element (or node/ NFVI and/or a corresponding network element in slice 1 for a message received in slice 2) may update a routing table and/or link state database in accordance with the information received. For instance, in one example, energy utilization information may be included in one or more additional fields in a link state database and/or routing table.

In one example, one or more of the above-mentioned routing protocols may be extended to account for one or more "energy" factors as additional "cost(s)" and/or to modify "costs" that may be calculated as per the existing protocol(s). In other words, when energy utilization-aware routing is selected, a different rule, or set of rules may be activated for calculating link/node costs, and may thus affect packet/flow routing in network 102. Alternatively, when energy utilization-aware routing is selected for a packet/ flow, one or more policies/rules may be activated that supersede a default routing algorithm that may be applied to a link state database and/or derived from a routing table. In one example, energy utilization-aware routing may be selected when a flow is established. For instance, one or more initial packets may include a flag, indicator, or the like, e.g., within a packet header field, with a designated meaning of "renewable energy based routing," "energy efficient routing," etc. It should be noted that in one example, no flag or another flag in a designated field may indicate that default, best performance routing may be preferred. It should also be noted that the preferred routing (e.g., energy utilization-aware or not) may be selected by either endpoint of a flow. For instance, device 182 may establish communication with one of the server(s) 132 for streaming video, and either device 182 or the one of the server(s) 132 may request a specific type of routing in accordance with the present disclosure. The packets for the video stream/flow may then be received by one or more of network elements 161, 162, 171, and/or 172 and routed accordingly.

In one example, routing preferences may alternatively or additionally be established in advance of any packet(s)/flow (s) designated for a particular type of routing. For instance, a content provider operating server(s) 131 and/or 132 may designate that any flows originating or terminating at server (s) 131 and/or 132 be provided with "renewable energy-based routing." In one example, the designation(s) may be identified by IP address(es) and/or IP range(s). In one example, such designation(s) may be further defined by source port(s) and/or destination port(s) (or any combination/sub-combination of source/destination IP address(es), sources/destination port(s), etc.), and so forth. In one example, such preferences may be communicated to server (s) 104, which may comprise a public web server or the like via which users, enterprises, etc. may request energy utilization-aware routing from network 102. As such, server(s) 104 may push policies to network elements 161, 162, 171, and/or 172 relating to designated IP addresses, IP address/ port combinations, tuples, flows, etc. For instance, network elements 161, 162, 171, and/or 172 may select routes and may transmit/forward/route packets in accordance with policies that supersede a default routing algorithm, where such policies may provide for energy utilization-aware routing (or for other purposes, such as "domestic-only" routing for enhanced security, priority slice selection, such as for first responders engaging in critical communications in responding to emergencies, and so forth). In one example, server(s) 104 may be a participant in a control channel virtual network (such as slice 2) and may transmit such instructions/updates to network elements via the control channel virtual network.

In one example, an energy utilization-aware routing preference may be selected (or revoked) at any time after the commencement of a flow. For example, a video streaming service may provide for energy efficient routing for its customer streams. For instance, the video streaming service may arrange with an operator of network 102 for discount or bulk pricing for all flows to obtain energy efficient routing. However, a video server, such as one of the server(s) 131 and/or 132 may detect that a video stream for one of devices 181-184 (e.g., a flow via network 102) is experiencing delays or the like that may affect the video quality or other aspects of the user experience. As such, the server(s) 131 and/or 132 may request that energy efficient routing be temporarily suspended for the particular flow/video stream or multiple video streams for various customers via network 102. In one example, this may be accomplished by changing a flag/indicator in the packets, via message to server(s) 104, or the like. These and other aspects of the present disclosure are further described below in connection with the example method 200 of FIG. 2.

In addition, it should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as additional border elements, routers, switches, policy servers, security devices, gateways, a content distribution network (CDN), and the like. Similarly, although only two access networks 120 and 122 are shown, in other examples, access networks 120 and/or 122 may each comprise a plurality of different access networks that may interface with network 102 independently or in a chained manner. For example, devices 181 and 182, and server(s) 131, respectively, may be in communication with network 102 via different access networks, and devices 183 and 184, and server(s) 132, may be in communication with network 102 via two or more different access networks, and so forth. It should also be noted that in one example, energy utilization-aware/energy factor-based routing may also extend to one or more of access network(s) 120 and 122. Thus, these and other modifications are all contemplated within the scope of the present disclosure.

FIG. 2 illustrates a flowchart of an example method 200 for routing at least one packet in response to a selection of an energy factor-based routing. In one example, the method 200 is performed by a network-based component of the system 100 of FIG. 1, such as by one of network elements 161, 162, 171, or 172, and/or any one or more components thereof (e.g., a processor, or processors, performing operations stored in and loaded from a memory), by a network element in conjunction with one or more other devices, such as one or more other network elements, server(s) 104 and/or SDN controller 106, endpoint devices, and so forth. In one example, the steps, functions, or operations of method 200 may be performed by a computing device or system 300, and/or processor 302 as described in connection with FIG. 3 below. For instance, the computing device or system 300 may represent any one or more components of FIG. 1 or the like that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system obtains at least a first energy usage indicator of at least a first network element of the communication network. In one example, the processing system may be deployed in a second network element of the communication network. In one example, each of the at least the first network element and the second network element may comprise a switch, a router, a gateway, or the like. In one example, either or both of the first network element and the second network element may comprise NFVI hosting VNF(s). In one example, the network elements may include cellular network components, such as an SGW, a PGW, etc. In one example, step 210 may include obtaining a plurality of energy usage indicators of a plurality of network elements of the communication network.

In one example, the at least the first energy usage indicator may comprise an energy source of the at least the first network element (e.g., natural gas, coal, nuclear, wind, solar, geothermal, hydroelectric, etc.). In one example, the at least the first energy usage indicator may alternatively or additionally comprise at least one energy efficiency metric of the at least the first network element, such as, an energy utilization per unit time and/or an energy utilization per data volume (e.g., within a lookback time window of the previous hour, day, week, etc.).

In one example, the at least the first energy usage indicator of the at least the first network element may be obtained via a second communication mode that is different from a first communication mode for user/data traffic. For instance, in one example, the second communication mode may comprise routing protocol messages. In one example, the first communication mode may comprise a first logical network of the communication network, and the second communication mode may comprise a second logical network of the communication network. For instance, the first logical network may comprise a first network slice, and the second logical network may comprise a second network slice, such as slices 1 and 2 of network 102 of FIG. 1. Alternatively, or in addition, the logical networks may comprise virtual local area networks (VLANs), or the like. In one example, the processing system may be a subscriber to receive energy usage indicators of all or a portion of the plurality of network elements of the communication network. For instance, in one example, energy usage indicators may be published by various participating network elements to a second logical network/network slice in accordance with a stream processing platform (such as Apache Kafka, or the like), where the processing system may comprise a subscriber to a stream for energy usage indicators.

At step 220, the processing system obtains a selection of an energy factor-based routing (e.g., an energy utilization-aware routing) for at least one packet. In one example, the selection may be included in the at least one packet. For instance, the selection may be contained in a header options field of the at least one packet, e.g., a Transmission Control Protocol (TCP) options field, an IP options field, or the like. In another example, the selection may be obtained via the second communication mode, e.g., via messaging over a second logical network/network slice. In one example, a source or destination endpoint device (e.g., a user endpoint device) may provide the selection. In one example, a server (e.g., a web server, a CDN edge server, or the like) may provide the selection of transmission of content to a client endpoint device. In one example, the selection may be pre-specified for the at least one packet, or flow, by source IP, destination IP, or both (or by source IP, destination IP, source port, destination port, or any combination/sub-combination thereof). For example, an enterprise may have many machine type communication (MTC) flows for uploading sensor data to database servers or the like, and may request renewable energy routing for these flows, which may be defined in advance. In one example, the selection may further specify one or more time and/or date ranges for particular types of routing for designated IP range(s), flows, etc.

In one example, the selection may be a binary selection between choices of [renewable energy-based routing, no preference], [energy-efficient routing, no preference], or the like (e.g., where energy efficient routing may be designated as having an energy utilization metric below a network operator defined threshold or the like). In one example, the selection may be from among available tiers or categories of service, such as [energy efficient, balanced, or performance]. In one example, the selection may indicate an energy-based routing preference, where the processing system may attempt to best meet the preferences according to operator-defined policy or policies. For example, the selection may comprise a flag, indicator, or the like with a designated meaning of "renewable energy based routing is preferred." In such case, network elements powered by renewable energy sources may be favored based on weighted costs of a routing algorithm. However, where latency, throughput, or other performance indicators are predicted to not meet one or more thresholds, other network elements may be included in a selected routing path that may avoid packet loss, delay, jitter, buffer depletion, or other issues. In other words, energy utilization may not be the sole factor that is used for energy utilization-aware routing.

At step 230, the processing system routes the at least one packet in response to the selection of the energy factor-based routing, where the energy factor-based routing is based upon the at least the first energy usage indicator of the at least a first network element. In one example, the routing of step 230 may comprise a policy-based routing in accordance with a plurality of energy usage indicators of a plurality of network elements of the communication network (which may be obtained at step 210). In one example, the routing may be based upon the plurality of energy usage indicators of the plurality of network elements and at least one of: link costs for links between the plurality of network elements, network delay of at least one of the plurality of network elements or the links between the plurality of network elements, or a number of hops between network elements from a source to a destination within the communication network.

Alternatively, or in addition, the routing may be in accordance with link costs, where the link costs (e.g., based on throughput/capacity, or other factor(s)) may be modified based upon one or more energy factor(s). For instance, cost-based routing such as Open Shortest Path First (OSPF), Enhanced Interior Gateway Routing Protocol (EIGRP), or the like may be extended to account for one or more "energy" factors as additional cost(s). For instance, if a "renewable energy source routing preferred" option is selected, the cost of routing via a non-renewable energy source powered network element may be increased, even if the network element and or the link thereto has a high throughput, short distance, and so forth. In another example, a cost may be reduced when a network element is renewable energy powered. In one example, a scaling factor may be applied based on the energy source, e.g., the type thereof. Similarly, in one example where the selection indicates that energy efficient routing is preferred, a cost of a network element may be scaled to be lower when the network element is energy efficient compared to peers, and conversely may be increased when the network element is energy inefficient compared to peers. In one example, scaling factors for different energy sources or types of energy sources may be set by a network operator. In one example, a scaling factor may be applied to a cost calculation for a network element, where the scaling factor may be proportional to the energy utilization metric for a network element (e.g., energy utilization per unit time and/or per data volume). It should be noted that examples of the present disclosure are not limited to any particular routing protocol and may relate to other interior routing protocols (e.g., Routing Information Protocol (RIP)), exterior routing protocols (e.g., Exterior Gateway Protocol (EGP), Border Gateway Protocol (BGP), or the like), and so forth.

In one example, step 230 may include choosing a slice, VLAN, or the like to transmit the at least one packet based on the selection. For instance, the processing system may comprise a gateway on shared infrastructure that is in communication with various slices. In addition, there may be network elements that are powered by renewable sources and which may be placed in a segregated logical network/slices. For instance slice 1 of FIG. 1 may be split into two slices for user/data traffic, while slice 2 may be used as a control channel to exchange energy usage indicators. In one example, user/data traffic having a designated indicator and/or identified via policy may be routed to such a designated slice and may be charged differently. Other traffic not having a designated indicator or otherwise not selected for the renewable energy slice may be routed to another slice.

It should be noted that in such an example, the network slicing may include physical segregation of network elements comprising the different slices. However, where a second communication mode comprising a second logical network is used to exchange energy usage indicators, the second logical network may be on a shared infrastructure with any physical components supporting network elements of user/data traffic slices (e.g., including both a renewable energy source slice and one or more non-renewable energy-based slices). In addition, it should be noted that in one example, selected network elements may participate in energy utilization-aware routing, while other network elements may operate according to existing routing protocols and/or other policy based routing. For instance, NEs 171 and 172 may be energy utilization aware, while within user data/traffic slices, routing may remain unchanged in accordance with the present disclosure.

At optional step 240, the processing system calculates at least a second energy efficiency metric of the second network element. For instance, as noted above, network elements may exchange energy usage indicators, and as such, may calculate their own utilizations to share with peers. As such, optional step 240 may include measuring/calculating an energy utilization per unit time and/or per data volume of the second network element.

At optional step 250, the processing system transmits at least a second energy usage indicator of the second network element. For instance, the at least a second energy usage indicator may include the energy utilization per unit time and/or per data volume of the second network element. Alternatively, or in addition, the at least the second energy usage indicator may include an indicator or an energy source of the second network element (e.g., natural gas, coal, nuclear, wind, solar, geothermal, hydroelectric, etc.). It should be noted that network elements may transmit energy usage indicators on an ongoing basis, e.g., periodically, opportunistically, and/or in response to certain events. For example, a data center may generally run on hydroelectric power. However, there may be a problem with the power source such that the data center is temporarily operating off of natural gas power. In such case, the affected network element(s) may transmit updates to peer indicating the current power source type (e.g., via the second communication mode/control channel virtual network).

Following step 230 or any of the optional steps 240 or 250, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example, the processing system may repeat steps 220-230 for additional packets and/or flows, steps 210-250 on an ongoing basis to exchange energy utilization information with other network elements and to route packets and/or flows, and so on. In one example, the method 200 may include calculating an end-to-end energy utilization for one or more flows (e.g., within a portion of a network where energy utilization is tracked and in which energy utilization metrics are exchanged between network elements) and reporting the end-to-end energy utilization(s), e.g., to a network operator and/or to the sources and/or destinations of such flows. For instance, a data volume of a flow may be multiplied by energy utilization per data volume for each network element in a path of the flow, and then summed. In one example, the method 200 may support energy utilization-aware multi-cast routing. For instance, the at least one packet may be a multi-cast packet, e.g., part a multi-cast flow from a source to multiple recipients/destination devices. In one example, the method 200 may be expanded to include steps of authenticating network elements to access a second logical network for transmitting and receiving energy utilization indicators. In one example, the method 200 may be further expanded to include the use of the second logical network for authentication and authorization of endpoint devices of a flow. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above-described method(s) can be combined, separated, and/or performed in a different order from that described above, without departing from the example embodiments of the present disclosure.

Figure 3:
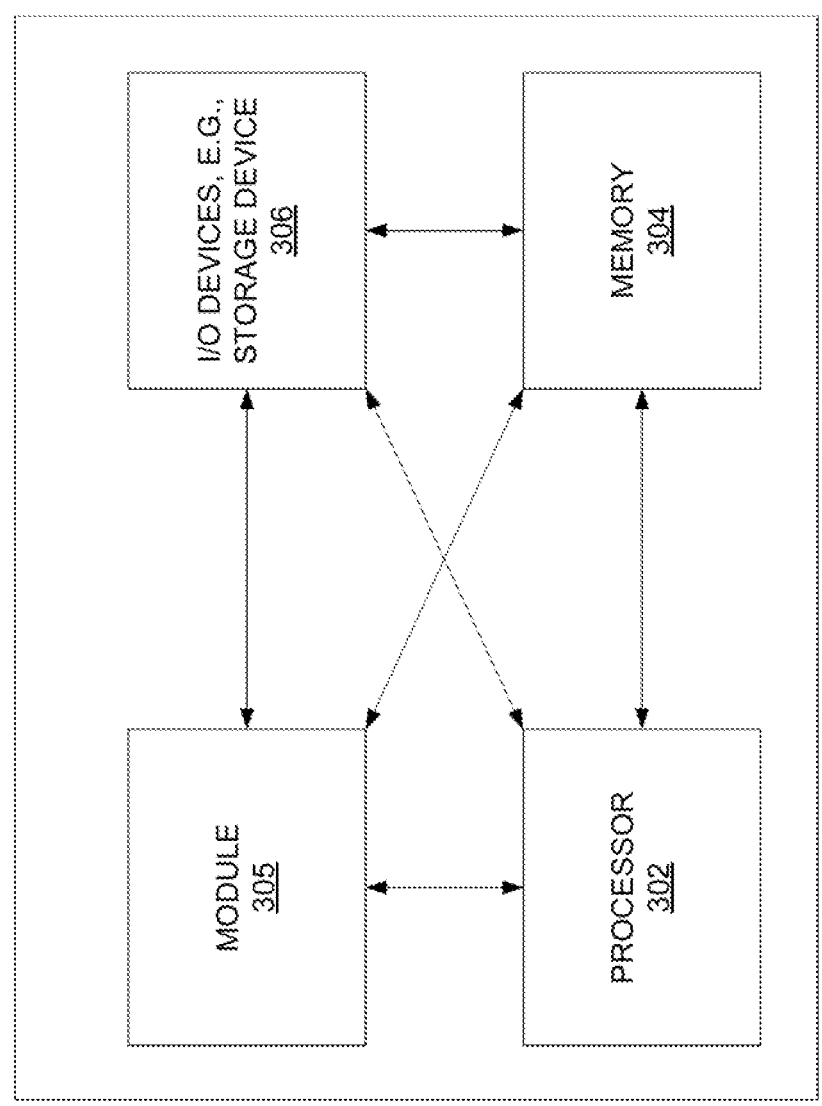
FIG. 3 illustrates a high level block diagram of a computing device specifically programmed to perform the steps, functions, blocks and/or operations described herein.

FIG. 3 depicts a high-level block diagram of a computing device or processing system specifically programmed to perform the functions described herein. For example, any one or more components or devices illustrated in FIG. 1 or described in connection with the example(s) of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for routing at least one packet in response to a selection of an energy factor-based routing, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above-disclosed method(s). In one example, instructions and data for the present module or process 305 for routing at least one packet in response to a selection of an energy factor-based routing (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above-described method(s) can be perceived as a programmed processor or a specialized processor. As such, the present module 305 for routing at least one packet in response to a selection of an energy factor-based routing (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

obtaining, by a processing system including at least one processor deployed in a communication network, at least a first energy usage indicator of at least a first network element of the communication network, wherein the at least the first energy usage indicator comprises an indicator of a type of energy source of the at least the first network element, and wherein the indicator of the type of energy source is one of a plurality of indicators including at least two indicators from among: a natural gas energy source indicator, a coal energy source indicator, a nuclear energy source indicator, a wind energy source indicator, a solar energy source indicator, a geothermal energy source indicator, or a hydroelectric energy source indicator;

obtaining, by the processing system, a selection of an energy factor-based routing for at least one packet, wherein the selection is included in the at least one packet and wherein the selection distinguishes the energy factor-based routing from a non-energy factor-based routing; and routing, by the processing system, the at least one packet in response to the selection of the energy factor-based routing, wherein the energy factor-based routing is based upon the at least the first energy usage indicator of the at least the first network element.

2. The method of claim 1, wherein the selection is contained in a header options field of the at least one packet.

3. The method of claim 1, wherein the at least one packet is routed via a first communication mode, and wherein the at least the first energy usage indicator of the at least the first network element is obtained via a second communication mode that is different from the first communication mode.

4. The method of claim 3, wherein the second communication mode comprises routing protocol messages.

5. The method of claim 3, wherein the first communication mode comprises a first logical network of the communication network, and wherein the second communication mode comprises a second logical network of the communication network.

6. The method of claim 5, wherein the first logical network comprises a first network slice, and wherein the second logical network comprises a second network slice.

7. The method of claim 5, wherein the selection is obtained via the second communication mode.

8. The method of claim 1, wherein the energy factor-based routing comprises a policy-based routing in accordance with a plurality of energy usage indicators of a plurality of network elements of the communication network.

9. The method of claim 8, wherein the obtaining comprises obtaining the plurality of energy usage indicators of the plurality of network elements of the communication network.

10. The method of claim 8, wherein the energy factor-based routing is based upon the plurality of energy usage indicators of the plurality of network elements and at least one of:

link costs for links between the plurality of network elements;

network delay of at least one of: the plurality of network elements or the links between the plurality of network elements; or a number of hops between network elements from a source to a destination within the communication network.

11. The method of claim 1, wherein the at least the first energy usage indicator further comprises at least one energy efficiency metric of the at least the first network element.

12. The method of claim 11, wherein the at least one energy efficiency metric comprises at least one of:

an energy utilization per unit time; or an energy utilization per data volume.

13. The method of claim 1, wherein the processing system comprises a processing system of a second network element of the communication network.

14. The method of claim 13, wherein each of the at least the first network element and the second network element comprises one of:

a switch;

a router; or a gateway.

15. The method of claim 13, further comprising:

transmitting, by the processing system, at least a second energy usage indicator of the second network element.

16. The method of claim 15, wherein the at least the second energy usage indicator comprises at least a second energy efficiency metric, the method further comprising:

calculating, by the processing system, the at least the second energy efficiency metric.

17. A non-transitory computer-readable medium storing instructions which, when executed by a processing system including at least one processor when deployed in a communication network, cause the processing system to perform operations, the operations comprising:

obtaining at least a first energy usage indicator of at least a first network element of the communication network, wherein the at least the first energy usage indicator comprises an indicator of a type of energy source of the at least the first network element, and wherein the indicator of the type of energy source is one of a plurality of indicators including at least two indicators from among: a natural gas energy source indicator, a coal energy source indicator, a nuclear energy source indicator, a wind energy source indicator, a solar energy source indicator, a geothermal energy source indicator, or a hydroelectric energy source indicator;

obtaining a selection of an energy factor-based routing for at least one packet, wherein the selection is included in the at least one packet and wherein the selection distinguishes the energy factor-based routing from a non-energy factor-based routing; and routing the at least one packet in response to the selection of the energy factor-based routing, wherein the energy factor-based routing is based upon the at least the first energy usage indicator of the at least the first network element.

18. An apparatus comprising:

a processing system including at least one processor; and a computer-readable medium storing instructions which, when executed by the processing system when deployed in a communication network, cause the processing system to perform operations, the operations comprising:

obtaining at least a first energy usage indicator of at least a first network element of the communication network, wherein the at least the first energy usage indicator comprises an indicator of a type of energy source of the at least the first network element, and wherein the indicator of the type of energy source is one of a plurality of indicators including at least two indicators from among: a natural gas energy source indicator, a coal energy source indicator, a nuclear energy source indicator, a wind energy source indicator, a solar energy source indicator, a geothermal energy source indicator, or a hydroelectric energy source indicator;

obtaining a selection of an energy factor-based routing for at least one packet, wherein the selection is included in the at least one packet and wherein the selection distinguishes the energy factor-based routing from a non-energy factor-based routing; and routing the at least one packet in response to the selection of the energy factor-based routing, wherein the energy factor-based routing is based upon the at least the first energy usage indicator of the at least the first network element.

19. The apparatus of claim 18, wherein the selection is contained in a header options field of the at least one packet.

20. The apparatus of claim 18, wherein the at least one packet is routed via a first communication mode, and wherein the at least the first energy usage indicator of the at least the first network element is obtained via a second communication mode that is different from the first communication mode.

* * * * *